Patented Feb. 13, 1951

2,541,909

UNITED STATES PATENT OFFICE 2,541,909

CATION-EXCHANGE PHENOLIC RESIN COMPOSITIONS AND METHOD OF PRODUCING THEM

Richard B. Bailey and Cynthia Camp Watkins, Portland, Oreg., assignors to Zehrung Chemical Company, Portland, Oreg., a corporation of Oregon No Drawing. Application November 30, 1946, Serial No. 713,388

9 Claims. (Cl. 260—49)

This invention relates to resinous compositions and processes for their production, and more particularly to resinous compositions exhibiting cation-exchange properties.

Applicants have discovered that an infusible resin may be produced by a one-step condensation reaction between a phenolic compound, a furan body and, if desired, an active methylene-containing compound, in the presence of an acid catalyst. Moreover, this condensation may, according to the present invention, be effected at atmospheric pressure below the boiling point of the mixture of said constituents and in a relatively short period of time. These resins may be sulfonated by relatively mild and easily controlled chemical treatment to produce efficient cation-exchange materials.

More specifically, the present invention comprises mixing together a phenolic compound, a furan body and, if desired, an active methylene-containing compound, effecting complete condensation of the mixture by heating the mixture in the presence of an acid catalyst to a temperature substantially below the boiling point of the mixture, and subsequently sulfonating the thus prepared resin to obtain the desired cation-exchange material.

It is an object of the invention to produce an efficient cation-exchange material which is substantially completely insoluble in the fluid which is to be treated and which possesses high capacity for ion exchange and is capable of rapid regeneration.

In commercial practice, ion-exchange materials are frequently employed in the form of granular particles and placed in a flow column through which is passed the fluid to be treated. A further object of the invention is, therefore, to provide a cation-exchange material which is hard and tough, particles of which do not easily crumble nor tend to pack together and thus deter the fluid flow.

According to the inventive concept the various components to be employed in the preparation of the resin, i. e. a phenolic compound, a furan body, an active methylene-containing compound, and an acid catalyst, are mixed to form a homogeneous solution. Cooling means may be provided to prevent spontaneous overheating of the solution. The resulting solution is then dispensed into a condensing chamber maintained at elevated temperature whereupon the fluid mixture is condensed to an infusible resin and excess moisture is expelled therefrom. The resin cake thus formed is then crushed and screened to obtain the desired particle size.

The resin particles are then sulfonated and washed to free the resin of occluded reagents to obtain the desired cation exchange resin. This resin may further be treated with an alkaline-reacting compound of an alkali metal to prepare the alkali metal sulfonate form of the resin.

The resinous compositions of the present invention may be prepared from phenolic compounds such as hydroxybenzene, resorcinol, the cresols, xylenols and others. Furan type compounds such as furfural and other derivatives thereof are adaptable for use in preparing the products of the invention.

Products obtained by condensing a phenol and, for example, furfural, in the presence of an acid catalyst and subsequently sulfonating the thus prepared resin substantially as described hereinbelow are found to "throw" a slight amount of color when treated with water, i. e. the resins are slightly soluble in water. For some purposes, this coloration of the water is not considered objectionable. On the other hand, sulfonated resins consisting of a phenol, a furan body and an active methylene-containing compound such as formaldehyde, acetaldehyde and higher aldehydes having similar reactivity as, for example, propionaldehyde and butyraldehyde, and prepared by a one-step condensation reaction as disclosed hereinbelow, are found to throw no color. The differences in solubility may be the result of cross-linkage made possible by the presence of the methylene groups.

The condensation reaction is advantageously catalyzed by adding thereto a concentrated acid such as sulfuric acid (96%), hydrochloric acid (35%), phosphoric acid (92%) and others. Oleum is a preferred acid for this use.

The proportions of ingredients are variable within limits, depending largely upon the characteristics desired in the finished product. According to the invention the products may contain, in percentages by weight, from about 8% to about 55% of a phenol body, from about 35% to about 80% of a furan body, and, if desired, up to about 12% of an active methylene-containing body. In general, the amount of acid catalyst used ranges from about 7% to about 10% by weight of the above identified mixtures, although smaller or larger amounts may be required for different methods of operation.

The operating condition of the process are likewise variable, depending in part upon the ratio of constituents present and in part upon the characteristics desired in the finished product. It will be apparent to those skilled in the art that over-all operating conditions will also depend somewhat on the types of equipment used in the production of the resin.

The components of the resin are first mixed together throughly by any suitable method known in the art. As these components are mixed, and particularly when oleum is employed as a catalyst, an exothermic reaction ensues between the acid and any water present in the mixture and heat is evolved. Thus it may be necessary to provide the mixing apparatus with cooling means whereby the heat resulting from such reaction may be controlled in order to prevent premature condensation of the reactive constituents. In general, it is desirable to maintain the temperature of this mixing operation below 150° F., room temperatures being preferred.

In the preferred embodiment of the process of the invention, the homogeneous solution resulting from the above described mixing operation is dispensed into a condensing oven, whereupon the reactive constituents condense to form a hard resinous cake. In general, oven temperatures substantially below the decomposition temperature of the resin and above the boiling point of water are employed, although for some purposes temperatures below the boiling point of water may be employed. For example, such temperatures may be practicable when substantial dehydration of the resin is not desired.

The time duration of this treatment is dependent in part upon the temperature employed and in part upon the constitution of the reacting mixture. It has been observed that some of the prepared fluid mixtures immediately condense to resinous form upon exposure to the temperatures of the oven, while others react slowly, being completely condensed in about six hours' time. Although the time of this treatment may be extended as desired, a duration of about one hour is generally sufficient to produce the desired condensation and dehydration. The resinous product obtained is a hard, usually porous cake having a lustrous black appearance.

The thus prepared resins are then processed for preparing cation-exchange materials. According to the invention, the resin preferably is crushed, for example, to a particle size of between about 10 and about 50 mesh, for convenient use in standard water softening devices. The fines resulting from such crushing may be returned to the fluid resulting from the initial mixing operation and treated therewith as described above. This preliminarily crushed and sized resin is then treated chemically in such manner as to cause the resin to have combined therewith sulfonic acid groupings. Conventional sulfonating agents may be employed in this treatment, it being preferred to use oleum for this purpose. When combined with the resin, these active sulfonic acid groupings, or their alkali metal salts, function to exchange cations according to well-known chemical reactions.

Illustrative of the present invention is the preparation of the sulfonic acid and alkali metal sulfonate resins wherein the granular resin is treated with a sulfonating agent such as oleum. It has been found that temperatures ranging from about room temperature to about 250° F. are sufficient to bring about the desired sulfonation, the time of such treatment depending upon the character of the resin and the degree of sulfonation desired. Treatment times from about 15 minutes to about 20 hours for sulfonation have been practiced, the treatment generally being not more than about one hour duration. Excellent cation-exchange resins have been prepared according to the invention wherein a temperature of about 250° F. maintained for about one hour was found to be very satisfactory. Oleum in excess of the stoichiometric amount is generally used, but smaller amounts may be desirable in some instances, depending upon the degree of sulfonation desired, it being recognized that a lower limit of reagent concentration exists below which sulfonation does not obtain.

After sulfonation the resin may be treated with a solution of an alkaline-reacting compound of an alkali metal, e. g. sodium carbonate, sodium hydroxide and the like, to obtain the alkali metal salt of the sulfonated resin. Thus, when ion exchange reactions occur, a soluble alkali salt is formed rather than an acid which, when present in the water, may be detrimental to the subsequent use thereof for certain applications. However, it should be emphasized that the materials operate on the hydrogen cycle with equal efficiency as when the alkali metal salt is used, and therefore the sulfonic acid form of the resin may be employed wherever desired.

Cation-exchange resins illustrative of the present invention were prepared in accordance with the above disclosed procedure and are described in the following examples wherein the proportions of ingredients are expressed in percentages representing parts by weight. Data on the total ion exchange capacity were obtained by passing an aqueous solution of calcium chloride of known concentration through a column of resin of known volume, and periodically analyzing the effluent by standard methods of water analysis. Results are evaluated on the basis of the amount, in grains, of calcium carbonate retained by one cubic foot of resin. Breakthrough ion exchange capacity is herein defined as the amount, in grains, of calcium carbonate retained by one cubic foot of resin at the time when the water flowing from the resin column, at a rate of 8 gallons per minute per cubic foot of resin, is found to contain 100 parts per million of calcium carbonate. Regeneration of the exhausted resins was obtained by passing a solution of sodium chloride through the resin.

*Example I*

8.5% phenol, 76.2% furfural, 8.5% oleum and 6.8% formaldehyde were treated as described hereinabove and the resin was sulfonated with excess oleum for one hour at about 212° F. The original break-through capacity was 10,100 grains per cubic foot of resin and upon regeneration the break-through capacity was 10,600 grains per cubic foot.

*Example II*

17.0% phenol, 67.7% furfural, 8.5% oleum and 6.8% formaldehyde were treated as in Example I. The original break-through capacity was 13,900 grains per cubic foot of resin and 10,000 grains per cubic foot after regeneration.

*Example III*

A resin was prepared as described above using 28.2% phenol, 52.4% furfural, 8.1% oleum and 11.3% formaldehyde, and sulfonated with excess oleum for two hours at 180° F. The original total capacity was 27,500 grains per cubic foot of resin and the original break-through was 24,200 grains per cubic foot of resin. After the first regeneration these capacities were 21,900 and 16,300 grains per cubic foot, respectively, and after a second regeneration the capacities were 21,700 and 17,200 grains per cubic foot of resin, respectively.

Other resins were prepared using components in the same proportions as Example III, substituting for formaldehyde aldehydes containing up to five carbon atoms. The sulfonated products prepared from these resins gave total and break-through capacities averaging 25,000 and 20,000 grains per cubic foot of resin, respectively.

Example IV

The resin of Example III was herein prepared using 85% phosphoric acid in place of the oleum catalyst. The thoroughly mixed components were treated in the condensing oven for three hours at 230° F. and the product subsequently sulfonated by treatment with oleum for 15 minutes at room temperature. The cation-exchange resin thus prepared gave original total capacity of 21,700 grains per cubic foot of resin, and an original break-through capacity of 16,900 grains per cubic foot of resin.

A similar resin was prepared using hydrochloric acid in place of oleum catalyst, and the sulfonated resin gave capacities of the same magnitude as in Example IV.

Example V

Furfuryl alcohol was substituted for furfural in preparing a resin using the proportions given in Example III. The mixture was treated in the condensing oven for one hour at 230° F. and subsequently sulfonated with oleum for 15 minutes at room temperature. The sulfonated resin gave a total capacity of 21,200 grains per cubic foot and a break-through capacity of 17,500 grains per cubic foot.

Example VI 29.5% resorcinol, 53.3% furfural, 9.0% of a 50% solution of concentrated hydrochloric acid catalyst, and 8.2% formaldehyde were mixed and treated in the condensing oven for one hour at 230° F., as described hereinabove, and the resulting resin was sulfonated with excess oleum for one-half hour at 212° F. Original total and break-through capacities were 13,900 and 10,300 grains per cubic foot of resin, respectively, and after regeneration these values were 13,400 and 10,000 grains per cubic foot, respectively.

Example VII 19.0% cresol, 62.0% furfural, 9.5% oleum and 9.5% formaldehyde were mixed as described above and allowed to condense in the oven at 230° F. for two hours. The resin thus produced was sulfonated with oleum for one hour at 212° F., and gave original total and break-through capacities of 16,700 and 14,000 grains per cubic foot of resin, respectively.

Example VIII 45.5% phenol, 45.5% furfural and 9% oleum were mixed and treated in the condensing oven for four hours at 180° F. to prepare a resin which was subsequently sulfonated with excess oleum at room temperature for three hours. This resin "threw" a slight amount of color when treated with water, but gave original total and break-through capacities of 19,200 and 17,200 grains per cubic foot, respectively. After regeneration these values were 18,900 and 18,300 grains per cubic foot, respectively.

Example IX 54.5% phenol, 36.4% furfural and 9.1% oleum were treated as in Example VIII. The sulfonated resin gave an original total capacity of 9,500 grains per cubic foot, and after regeneration the capacity was 9,700 grains per cubic foot.

It will be apparent to those skilled in the art that modifications may be made in the herein disclosed process without departing from the spirit of the invention. It may, for example, be desirable to employ pressures above atmospheric pressure to shorten the time of treatment. It may also be desirable in other instances to employ pressures below atmospheric pressure to avoid high temperatures, as, for example, in the dehydration of the resin while the condensation thereof is being effected. Accordingly, it is to be understood that the above disclosure is intended merely to illustrate the invention and that the scope of the invention is limited only as defined in the appended claims.

Having now described our invention and in what manner the same may be used, what we claim as new and desire to protect by Letters Patent is:

1. A cation-exchange composition comprising a sulfonated product of a resinous composition made from a mixture of approximately 3 parts phenol, approximately 5 parts furfural, approximately 1 part aliphatic aldehyde of the group consisting of formaldehyde, acetaldehyde, propionaldehyde, and butyraldehyde, and approximately 1 part acid catalyst the sulfonation of said resinous composition being conducted for at least 15 minutes at a temperature of 250° F.

2. A cation-exchange composition comprising a sulfonated product of a resinous composition made from a mixture of phenol, a furan body member of the group consisting of furfural and furfuryl alcohol, an aliphatic aldehyde of the group consisting of formaldehyde, acetaldehyde, propionaldehyde, and butyraldehyde, and an acid catalyst, wherein the phenol and the furan body member are present in a ratio ranging from a ratio of approximately 3 parts phenol to approximately 5 parts furan body member to a ratio of approximately 5 parts phenol to approximately 5 parts furan body member, and the acid catalyst and aliphatic aldehyde are present in approximately 1 part each, the sulfonation of said resinous composition having been conducted for not more than about one hour at 250° F.

3. A cation-exchange composition comprising a sulfonated product of a resinous composition made from a mixture of phenol and a furan body member of the group consisting of furfural and furfuryl alcohol, and an acid catalyst, wherein the phenol and the furan body member are present in a ratio ranging from a ratio of approximately 3 parts phenol to 5 parts furan body member to a ratio of approximately 5 parts phenol to approximately 5 parts furan body member, the sulfonation of said resinous composition having been conducted for a period of at least 15 minutes.

4. A process for producing an insoluble, dehydrated, resinous composition in a one-step condensation reaction comprising preparing at room temperatures an intimate mixture of a phenolic body consisting of one of the group consisting of phenol, resorcinol, cresol, and xylenol; a furan body member of the group consisting of furfural and furfuryl alcohol, an aliphatic aldehyde of the group consisting of formaldehyde, acetaldehyde, propionaldehyde and butyraldehyde, and an acid catalyst, and thereafter dispensing said mixture into a chamber heated to a temperature above 100° C. and substantially below the decomposition temperature of the resinous composition for a time sufficient to effect the condensation of said mixture and to remove the water of condensation.

5. A process for producing an insoluble, dehydrated, resinous composition in a one-step condensation reaction comprising preparing at room temperatures an intimate mixture of a phenolic body of the group consisting of phenol, resorcinol, cresol, and xylenol; a furan body member of the group consisting of furfural and furfuryl alcohol, an aliphatic aldehyde of the group consisting of formaldehyde, acetaldehyde, propionaldehyde and butyraldehyde, and an acid catalyst; wherein the phenolic body and the furan body member are present in a ratio ranging from approximately 3 parts phenolic body to approximately 5 parts furan body member to a ratio of approximately 5 parts phenolic body to approximately 5 parts furan body member, and the acid catalyst and aliphatic aldehyde are present in approximately 1 part each; and thereafter dispensing said mixture into a chamber heated to a temperature above the boiling point of water and below the decomposition temperature of the resinous composition for a time not substantially over one hour to effect the condensation and substantial dehydration of said mixture.

6. A process for producing a cation-exchange resinous composition having a break-through capacity for the retention of more than fifteen thousand grains of calcium carbonate per cubic foot of resin before water flowing from the resin column at a rate of eight gallons per minute per cubic foot of resin is found to contain 100 parts per million of calcium carbonate, which method comprises preparing at temperatures below the boiling point of water a mixture consisting of approximately three parts phenol, approximately five parts of a member of the group consisting of furfural and furfuryl alcohol, approximately one part of an aliphatic aldehyde of the group consisting of formaldehyde, acetaldehyde, propionaldehyde and butyraldehyde, and approximately one part of an acid catalyst, and thereafter dispensing said mixture into a chamber heated to a temperature above the boiling point of water and substantially below the decomposition temperature of the resinous composition for a time sufficient to effect the condensation of said mixture, comminuting the resinous mass so formed, and sulfonating said comminuted resinous material for a period of at least 15 minutes and at a temperature of not to exceed 250° F.

7. The product of the process defined in claim 6.

8. The process for producing a cation-exchange resinous composition having a break-through capacity for the retention of more than fifteen thousand grains of calcium carbonate per cubic foot of resin before water flowing from the resin column at a rate of 8 gallons per minute per cubic foot of resin is found to contain 100 parts per million of calcium carbonate, which method comprises preparing at temperatures below the boiling point of water a mixture consisting of phenol, a furan body member of the group consisting of furfural and furfuryl alcohol, and an acid catalyst, wherein the phenol and the furan body member are present in a ratio ranging from 3 parts of phenol to 5 parts of furan body member to a ratio of from 5 parts of phenol to 5 parts of furan body member, thereafter dispensing said mixture into a chamber heated to a temperature above 100° C. and substantially below the decomposition temperature of the resinous composition for a time sufficient to effect the condensation of said mixture, comminuting the resinous mass so formed, and sulfonating said comminuted resinous material for a period of at least 15 minutes and at an elevated temperature not exceeding 250° F.

9. The product of the process defined in claim 8.

RICHARD B. BAILEY.
CYNTHIA CAMP WATKINS.

REFERENCES CITED

The following references are of record in the file of this patent:

UNITED STATES PATENTS

| Number | Name | Date |
|---|---|---|
| 1,771,508 | Novotny | July 29, 1930 |
| 2,361,754 | McFarland | Oct. 31, 1944 |

FOREIGN PATENTS

| Number | Country | Date |
|---|---|---|
| 305,624 | Germany | Dec. 12, 1919 |
| 363,917 | Germany | Nov. 14, 1922 |
| 365,626 | Germany | Dec. 19, 1922 |
| 816,448 | France | May 3, 1937 |